Inventor:
Manfred Schuck

United States Patent Office 3,474,992
Patented Oct. 28, 1969

3,474,992
RESILIENTLY YIELDING DAMPED MOUNTING
Manfred Schuck and Hellmut Franz, Munich, Germany, assignors to Optische Werke C. A. Steinheil Sohne G.m.b.H., Munich, Germany
Filed June 22, 1967, Ser. No. 648,076
Claims priority, application Germany, July 6, 1966, O 8,856; Oct. 14, 1966, O 9,042; Mar. 20, 1967, O 9,302, O 9,303
Int. Cl. E02d *27/44;* F16m *1/00;* F16f *15/04*
U.S. Cl. 248—15                                        18 Claims

ABSTRACT OF THE DISCLOSURE

Resiliently yieldable, damped mountings for a cushioned support of devices which are sensitive to shock, such as optical instruments mounted on vehicles. The mounting comprises means for restoring the instrument to its initial position occupied by the instrument before the shock, more particularly, for restoring an optical instrument into the direction of its original sight line.

SUMMARY

Resiliently yieldable damping means having a high damping capability and restoring means are carried by (other) parts of a mounting and connected or adapted to be connected to an instrument or other object which is sensitive to shock. The restoring means are adapted to move the mounting and instrument to their initial position occupied before a shock-induced movement. Each restoring means comprises at least one first mating element and at least one second mating element. The first and second mating elements have contact surfaces arranged to contact each other in said initial position. The contact surfaces belong to boundary surfaces of rigid materials forming said first and second mating elements at least at said contact surfaces. The restoring means further comprise energy storage means adapted to cause said first and second mating elements to approach and finally contact each other.

Such mountings are known per se. They are designed to adjust the instrument so that its position relative to an instrument carrier is the same as before a shock which caused a temporary change in the relative position. The instrument should be yieldable in all directions as uniformly as possible. A torsional shock on the implement should be converted by the mounting into a resiliently yielding, tilting movement.

To meet the above-mentioned requirements, a number of proposals have been made with the aim of protecting the instruments from the effects of peak accelerations which result from the shocks. However, the means used for this purpose operate only in the strictly elastic range and have the disadvantage that they yield too much so that the instrument yields resiliently when it is being operated, e.g., in response to a pressure force which is due to the application of the head of a screw member against the eye cup of the eyepiece or the forehead support, and the instrument is thus urged out of the adjusted position. With a telescopic sight, e.g., the sight line is thus changed so that the instrument can no longer perform its function.

Shock-absorbing mountings have been disclosed in which a frictional connection is provided between the optical instrument and its carrier. For this purpose, pressure members are used, e.g., in the form of spherical segments, which are forced by conical pistons against a fixed abutment. This arrangement has the disadvantage that the movement due to shock is not damped. Although frictional forces occur at the cushioned parts, these forces are not sufficient for an effective damping of the shock-induced movement in view of the high accelerations induced by the shocks and the large masses being moved. Above all, the shock forces which arise are introduced into the stationary abutments so that the necessary resilient yielding is not possible.

It is an object of the present invention to accomplish the object which has thus been outlined. Based upon a resiliently yieldable, damped mounting for a cushioned support of instruments which are sensitive to shock, e.g., of optical instruments mounted on vehicles, which mounting comprises means for restoring the instrument to an initial position occupied by the instrument before the shock, particularly for restoring the instrument into the direction of its original sight line, this object is accomplished according to the invention in that resilient means having a high damping capability as well as first and second mating elements for restoring the instrument to its initial position are provided to connect the instrument to its carrier, and the interface between said first and second mating elements for restoring the instrument is formed by surfaces of rigid and particularly metallic materials.

It is probably desirable to prestress the means having a high damping capability in such a manner that the instrument will not change its position unless it is subjected to the highest acceleration which is considered allowable. Hence, those shock forces will be allowable which occur in conjunction with the moved mass when the face of a viewer is applied to the eyepiece or the forehead supports to a shock-protected telescope, as mentioned above. The same result can be achieved by prestressing the energy storage means which serve for generating the restoring forces in the restoring means. Finally, the desired effect which has been described can be obtained by a prestressing of the resiliently yieldable means having a high damping capability and of the restoring springs, if such springs are used as restoring energy storage means.

A number of possibilities may be adopted to meet special requirements which are due to the need for arranging resiliently yieldable means having a high damping capability as well as of first and second mating elements which define interfaces formed by rigid materials, particularly metallic materials.

A mounting which is particularly simple in design will be obtained if the first mating elements have aligning, fitting and engaging surfaces faced by complementary surfaces of the second mating elements. These aligning, fitting and engaging surfaces may be formed, e.g., as conical or prismatic surfaces of the heads of cushioned pins that are mounted in or on the carrier for the instrument, whereas the complementary, hollow-conical or hollow-prismatic surfaces of the second mating elements in or on the instrument contact the pin head surfaces in the preferably adjusted initial position. The shank of the pin itself may have surfaces which extend at an angle to the axis of the bolt, and associated aligning, fitting and engaging surfaces may be formed on a second mating element. As a result of the cushioning of the pin, the beveled surfaces of the pin and the aligning, fitting and engaging surfaces of the second mating element contact each other in the initial position, a restoring of the instrument exactly to the initial position is enforced in spite of the damping of the shock-induced movements by the resiliently yieldable means. A particularly simple design of the beveled surfaces of the first and second mating elements will be obtained if a pin is terminated by an end cone, which is faced by a second mating element consisting of the bore of a flange which is formed or carried by the instrument and a conical seat for the end cone is provided at the transition from the bore to that end face of the flange which faces the end cone so that the desired centering is obtained. In a kinematic inversion, the first mating elements having the conical or prismatic surfaces may be provided on the instrument and the complementary, hollow-conical or hollow-prismatic surfaces of the second mating elements may be provided in or on the carrier for the instrument.

Various means may be used for cushioning the pins against the instrument or the instrument carrier. Resilient elements of rigid materials, such as metals, may be used. A multiple disc spring is particularly favorable because it affords a cushioning which is concentric with the axis of the bolt. However, the multiple disc springs may be replaced by orifice plates for passing gaseous or liquid fluids, as well as piston-cylinder arrangements in which the fluid is more or less compressed or allowed to escape in response to the shock. The overall design should be such that in a position in which the beveled fitting and aligning surfaces of the first and second mating elements contact each other an engaging surface of the pins engages the pin carrier so that the spring forces are transformed into a positively acting force for aligning the instrument.

The number and design of the restoring means are such that these means can move the instrument to a stable, statically determinate position, which can be approached to the initial position of the instrument with an accuracy which can be increased to any desired degree in dependence on the conditions under which the instrument operates whereas this accuracy can be obtained without need for components in addition to those required according to the present invention. The initial position of the instrument is suitably adjustable by adjusting means.

The mountings being considered may be subjected to shocks not only in one direction but in various directions and it is desired that the damping should be as uniform as possible in all directions. The same applies to the restoring action regardless of the direction of damped relative movements between the instrument and the instrument carrier under the action of shock.

To accomplish this, the mounting suggested according to the invention is further characterized in that those elements of the restoring means which are provided with aligning, fitting and engaging surfaces are cushioned both against the instrument carrier and against the instrument.

This may be accomplished in various ways.

It is advantageous in any case to provide separate spring means for cushioning the elements against the instrument and its carrier, respectively, which spring means have preferably the same spring characteristics and, if desired, the same initial stress.

A particularly space-saving design will be obtained if the springs are concentric, although this design need not be adopted. For instance, a plurality of springs may be used which are connected by yoke means. As the load is distributed to a plurality of springs, the same may be smaller than in other designs. It will depend on the prevailing circumstances what kind of spring means is to be adopted.

If the aligning, fitting and engaging surfaces of the elements of the restoring means are at an angle of 45° from the pin axis, which is parallel to the axis of the implement, shocks in directions which are horizontal or inclined from the horizontal will also be damped and will be followed by a restoring of the instrument to its initial position as shocks which are effective in the direction of the axes of the bolts and springs. The angle must not be one of 45°, although this is desirable. Virtually any shock in a horizontal or approximately horizontal direction will be deflected into different directions if the beveled surface used for this purpose has an inclination which is larger than the angle of friction with the materials concerned.

The first mating elements of the restoring means are suitably provided with guiding means consisting preferably of guiding surfaces in the form of a cylinder having an axis which coincides with the spring axis. The second mating elements may be formed with guiding surfaces provided on bearing rings of the instrument carrier, which surround the cylindrical guiding member and thus guide it in the intended manner. The first mating elements of the restoring means may consist in the manner suggested hereinbefore of pins, which extend parallel to the longitudinal axis of the instrument and instrument carrier and which have a shank that carries an end cone which is defined by the aligning surface whereas that end of the shank of the pin which is remote from the end cone may be formed with screw threads in threaded engagement with a nut, which engages the instrument carrier. This arrangement will enable a very simple adjustment of the pin. Any pin end cone may have associated with it an abutment, which is formed in a second mating element and constitutes a seat for the aligning, fitting and engaging surfaces. The seat is suitably formed by a flange of the instrument or parts thereof.

In springs of metal-clad rubber, which are preferably employed as resiliently yieldable means having a high damping capability, the working surfaces are also suitably disposed at an angle to the axes of the instrument and of the instrument carrier so that one and the same metal-clad rubber spring will be effective to damp shocks and to eliminate their effects, regardless of the direction of said shocks.

The designs which have been described hereinbefore may obviously be replaced by a kinematically inverted design. The remarks made with respect to the instrument are applicable in an inverted arrangement to the instrument carrier, and what has been said with respect to the instrument carrier is applicable to the instrument itself. Any changes within such kinematic inversions utilize the concept of the invention.

The specific design of the mountings according to the invention which have been defined hereinbefore can be selected with a view to the desired results. It has been found that optical instruments, e.g., on vehicles, can be protected as required from the detrimental effects of shocks from the vehicle and can be accurately restored into the direction, e.g., of an original sight line. It has also been shown that at the extremely high peak accelerations which result when the instrument engages the stops after the shock has occured give rise to rebounding and vibration phenomena, which normally decay too slowly, e.g., in view of a need for a very close succession of observations, signals etc. and of events to be initiated in response thereto. It has already been mentioned that the first and second mating elements of the means for restoring the instrument to its initial position must define an interface formed by boundary surfaces of parts consisting of rigid materials in order that the initial position can be re-established with the required degree of accuracy, which depends on the requirements to be met. More briefly, the interfaces of the restoring elements should preferably be formed by boundary surfaces of metallic parts although this may give rise to vibration.

This leads to another object to be acomplished according to the invention.

To accomplish this object, the invention is characterized in that resiliently yieldable elements having a high damping capability and serving for attenuating or dissipating rebound shocks are provided in addition to the first-mentioned, resiliently yieldable means having a high damping capability and in addition to the restoring means having first and second mating elements.

To give optimum results, these additional, resiliently yieldable elements having a high damping capability and serving to reduce or avoid the results of rebound phenomena must meet further requirements.

Inherently, the materials which may be used for such additional elements having a high damping capability may be subjected to permanent deformation. Unless these elements are disposed adjacent to those parts which are essential for an exact restoring of the instrument to its initial position, there will be a source of error which precludes a restoring of the instrument to its initial position. This restoring must be effected with the above-mentioned degree of accuracy if the mounting is to have the required performance. For an optimum design of the additional elements, an element having a high damping capability is disposed provided according to the invention in addition to the resiliently yielding means having a high damping capability and said additional element is disposed between that part of the first mating element which forms aligning, fitting and engaging surfaces and an abutment which belongs to the same restoring element and is under the action of prestressed springs which bear on the instrument and on the instrument carrier. The element having a high damping capability which is provided in addition to the resiliently yieldable means having a high damping capability may consist of copper, preferably of a copper ring, which is partly received in that preferably conical part of a first mating element which forms aligning, fitting and engaging surfaces. There are plastics materials which behave like copper, particularly polymers of anhydrous $CH_2O$. Further materials of this kind are lumps, blocks or pads of metal wire mesh.

Specifically, a mounting according to the invention may be provided with a design which ensures that the adjusted distance between the aligning, fitting and engaging surfaces of a part of a first mating element and its stop on the instrument carrier remains constant and elements having a high damping capability are provided in addition to the resiliently yieldable means having a high damping capability and are disposed outside of those parts of a first mating element of the restoring means which ensure the constant distance. This design will meet the above-mentioned requirement that the adjusted distance between that part of the first mating element which is formed with aligning, fitting and engaging surfaces and its stop on the instrument carrier is maintained regardless of any permanent deformation of the additional elements having a high damping capability.

A particularly simple design of the mounting according to the invention will be obtained if an element having a high damping capability which is provided in addition to the resiliently yieldable means having a high damping capability is disposed on the head of a pin on that boundary surface of said head which is remote from the end cone, said pin has at its end remote from the end cone the above-mentioned adjusting nut, which is adapted to be fixed in its adjusted position, and springs bearing on the instrument and instrument carrier are concentric with the longiudinal axis of the pin and at their ends facing the end cone engage an abutment, which engages the additional element having a high damping capability, and an instrument flange acting as a second mating element is formed with an aperture which forms a seat for the end cone. The heat-forming aperture may be alternatively used by a bushing which has been inserted in the flange.

Further recognitions underlying the invention indicate that a further improvement of the mounting according to the invention can be achieved in view of the fact that the first and second mating elements required for restoring the instrument to its initial position define an interface which is formed by boundary surfaces of parts of rigid materials. If these parts of the first and second mating elements consist of metal, the first and second mating elements need not consist entirely of metal. However, a simplification can probably be obtained, e.g., according to the above-mentioned suggestions, by providing the aligning, fitting and engaging surfaces for an exact restoring to the initial position on an end cone, which is integrally formed with a pin, and arranging the preferably prestressed restoring springs so that they are concentric with the axis of the shank of the pin.

It has been found, however, that this integral design has disadvantages. The pin is guided on a relatively large length so that it cannot automatically adjust itself, e.g., in response to displacements which may arise in prolonged use as a result of inevitable wear, permanent deformation due to overload, failure to effect an adjustment in time, adjustment errors etc.

Based on the mountings which have been defined initially hereinbefore, the resulting object is solved in that one of the first and second mating elements formed with boundary surfaces of rigid materials is divided and one of its parts has boundary surfaces which form at least part of the aligning, fitting and engaging surfaces and is joined to the remaining parts of the first or second mating element by surfaces which permit of tilting or pivotal movements of the parts relative to each other so that the parts formed with the aligning, fitting and engaging surfaces are self-adjusting whereby the accuracy with which the instrument is restored to its initial position is increased.

The teachings of the invention may be embodied in various structures. For instance, one of the parts may be a section of a portion which is formed with fitting, aligning and engaging surfaces, which lie in planes which intersect in a line, and the resulting prismatic section and adjoining parts may have a common tilting joint on an axis which is at right angles to the above-mentioned line of intersection, which may be imaginary or structural. Alternatively, one of the parts may have convex spherical surfaces and an adjoining part may have concave surfaces, which are preferably congruent with the convex surfaces, and said one part and the adjoining part may contact each other on spherical, preferably hemispherical surfaces. This design results in a hemispherical joint, which provides for a self-adjustment of that part of a first or second mating element which is formed with the aligning, fitting and engaging surfaces, regardless of the directions in which any displacement occurs. It is inherent in the invention that the joint may be extended to a complete sphere as closely as required, provided that those parts which contact the more or less complete sphere must consist of adjustable hollow spherical segments or sector so that they can embrace a bearing surface which extends beyond a hemisphere.

It will generally be sufficient to provide three first mating elements of rigid materials on the periphery of the instrument part to be mounted. In this case, the resiliently yielding means having a high damping capability may be accommodated between said first mating elements over a large peripheral length compared to the relatively small peripheral length of the restoring means so that the damping can be adjusted as desired in view of the damping properties of the materials employed.

Embodiments of the invention are shown by way of example on the drawings.

In all figures, reference numeral 1 designates an instrument which is sensitive to shock and to be protected from the effects of shock. This instrument, which may consist of an optical telescope, should be restored to its initial position when the acceleration exceeds a certain limit. Reference numeral 2 designates a carrier for the instrument.

Figure 2:
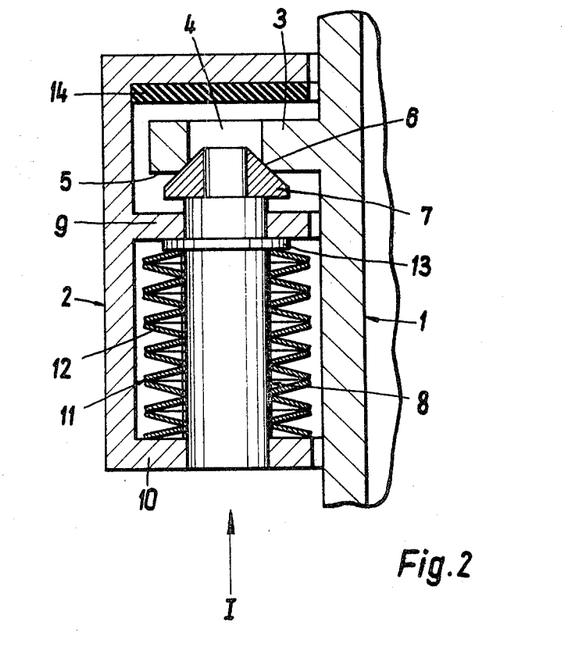
FIG. 2 is a vertical radial sectional view taken through the mounting on line II—II of FIG. 1.

As is apparent in FIG. 2, the instrument 1 has extensions in the form of lugs 3, which have longitudinal through bores 4. Seats 6 in the form of conical annular surfaces are formed at the transitions between the bores 4 and the lug end faces 5 and serve as aligning, fitting and engaging surfaces for mating, congruent, complementary fitting, aligning and engaging surfaces of the end cone 7 of the spring-cushioned pins 8. The latter are guided in lugs 9, 10 of the instrument carrier 2. A set 11 of spring discs 12 bears at one end on a collar 13 on the shank of the pin 8 and at the other end on a flange 10 of the instrument carrier 2. The set of spring discs (multiple disc spring) is prestressed so that the collar 13 is forced against the lug 9 of the instrument carrier in the illustrated initial position. The overall arrangement is completed by a stop 14, which consists of resiliently yieldable material and serves for limiting shocks which cannot be absorbed by resiliently yieldable means having a high damping capability.

Figure 1:
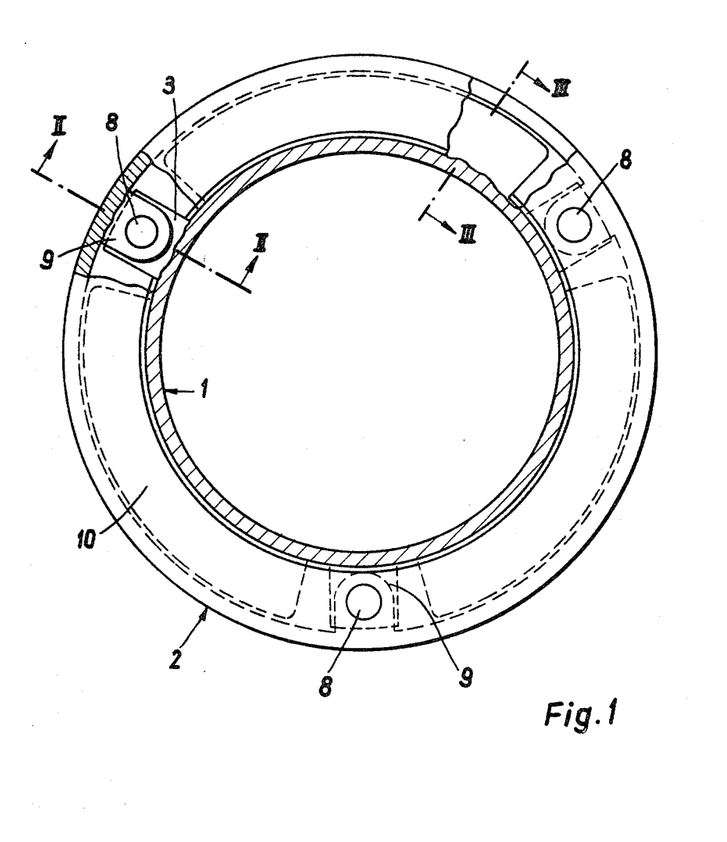
FIG. 1 is a top plan view showing the mounting according to the invention view in the direction of the arrow I of FIG. 3 whereas the instrument itself is seen in horizontal section.
Figure 3:
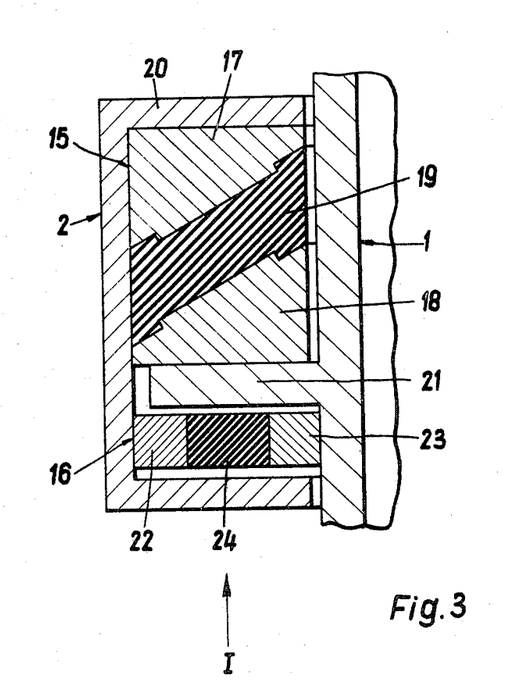
FIG. 3 is another vertical radial sectional view taken on line III—III of FIG. 1.

The last-mentioned means are shown in FIGS. 1 and 3. As is apparent from FIG. 1, these means lie between the three restoring means 7, 8, 11 consisting of rigid materials and consist of segment-shaped metal-clad rubber springs generally designated 15 and effective in the longitudinal direction, and further metal-clad rubber springs, which are generally designated 16 and effective in a radial direction. The metal-clad rubber springs 19 comprising the metal segments 17, 18 and the intermediate segments 19 of resiliently yieldable materials having a high damping capability bear at one end on a flange 20 of the instrument carrier 2 and at the other end on lugs 21 of the instrument 1. The metal-clad rubber springs 16 bear at one end with their outer ring 22 on the instrument carrier 2 and with the inner ring 23 on the instrument 1 when the intermediate rings 24 consist of resiliently yieldable materials having a high damping capability.

The mode of operation of a mounting as shown in FIGS. 1-3 is apparent from what has been said hereinbefore. Axial and radial shocks will be taken up by the metal-clad rubber springs 15, 16. If this moves the parts 1, 2 off center, the restoring means 7, 8, 11 consisting of rigid materials restore the parts to their initial position in that the strong prestressed multiple disc springs 11 force the end cone 7 forming a part of a first mating element of a restoring means into engagement with the aligning, fitting and engaging surfaces 6, which are constituted by a seat formed by a second mating element 3 of the restoring means. If the initial stress of the multiple disc springs 11 is higher than that of the resilient damping elements 19, 24, as mentioned hereinbefore, the requirement for the above-mentioned engagement of the collar 13 of the pin 8 with the lug 9 of the instrument carrier will be fulfilled.

Figure 4:
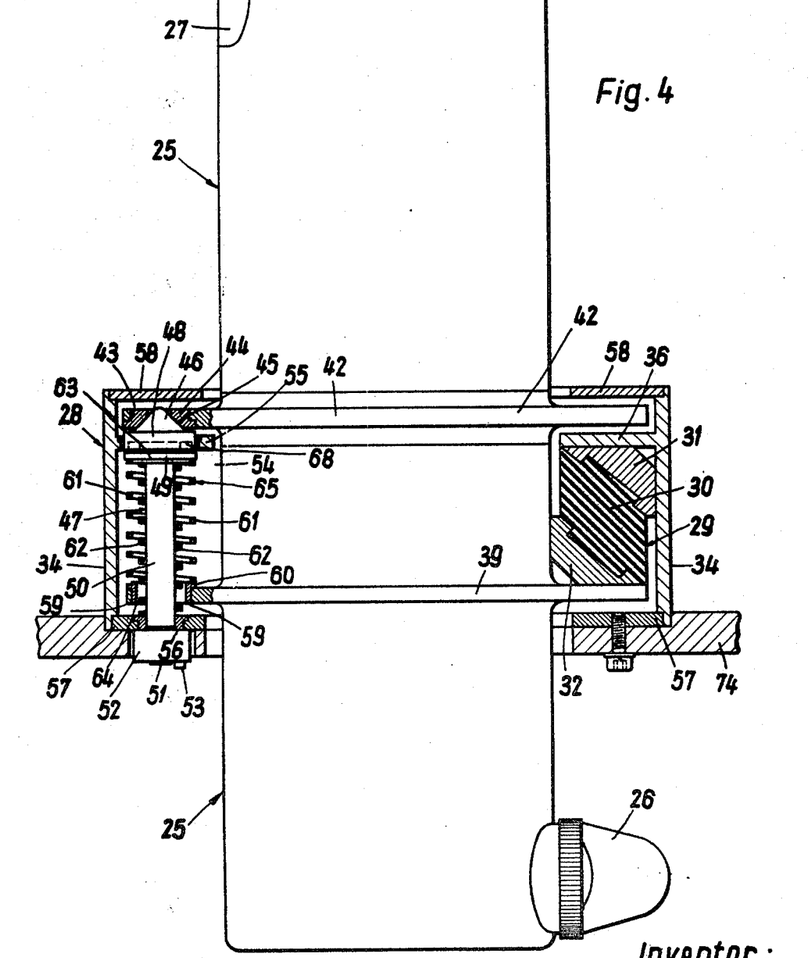
FIG. 4 shows as a further embodiment an overall arrangement in a vertical sectional view taken through a mounting according to the invention in a plane which contains restoring means for restoring the instrument to its initial position whereas the resiliently yieldable means having a high damping capability are shown in a different sectional view.
Figure 5:
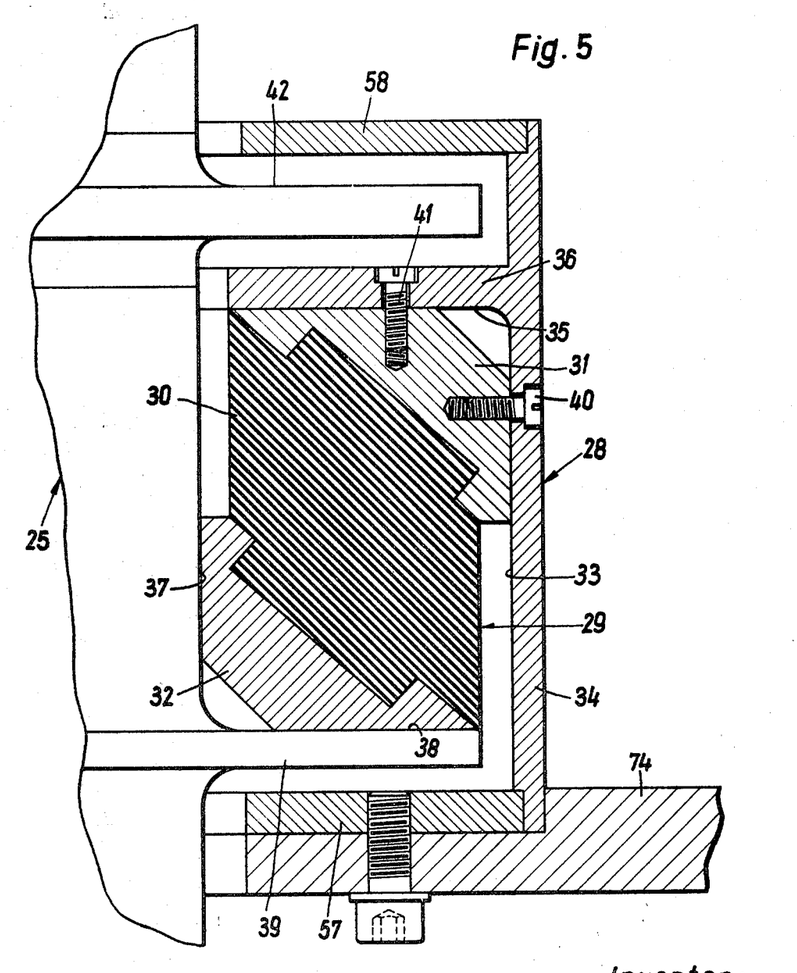
FIG. 5 is an enlarged sectional view similar to that of FIG. 4.

In another embodiment, shown in FIGS. 4 and 5, those elements of the restoring means which form the aligning, fitting and engaging surfaces bear on the instrument and the instrument carrier so that they are independent of the direction of the shock. The latter remark applies also to the resiliently yieldable means having a high damping capability. Different from the embodiment shown in FIGS. 1–3, there are no separate damping means for taking up axially and radially directed shocks, respectively, but the damping means are designed to damp and dissipate shock forces from all directions.

FIG. 4 shows an instrument 25 in the form of an eyepiece 26 and a light inlet 27. The instrument 25 is surrounded by an instrument carrier 28.

The following means are provided for a resilient cushioning of shocks regardless of their direction and an accurate restoring of the instrument 25 to the same position relative to the carrier 28 as before the shock.

The means for taking up the shock forces and for resiliently yieldably damping the same are evenly spaced on the periphery of the carrier 28. In the present embodiment, these means consist of metal-clad rubber springs, which are shown in the right-hand half of FIG. 4 and shown on an enlarged scale in FIG. 5. The invention is not restricted to these means. All materials may be used which meet certain requirements as to elongation, ultimate tensile stress, modulus of rigidity, recontracting speed, good rebound elasticity, return to initial shape, and high energy storage capacity corresponding to a high shock absorption. Suitable materials are woven fabrics of metal, metal wire mesh, bodies which have been compacted by mechanical, hydraulic, pneumatic or other means, blocks, lumps or pads of such materials, or said materials used in composites, such as metal-clad rubber springs. Rubber is stated as a suitable material only by way of example to illustrate the properties which are essential for the invention. Rubber may be replaced by elastomers and all other materials which can be extended in tension quickly to a large elongation with a relatively small loss of energy by heat dissipation and which have in a highly extended state a high ultimate tensile stress and a corresponding modulus of rigidity, furthermore, they must contract quickly, have a good rebound elasticity and upon a release of stress must substantially return to their original three-dimensional state. Only by way of example, ethylene glycol-adipic acid polyesters may be mentioned as a suitable material. The metal-clad rubber springs are generally designated 29. The elastomeric part 30 has a cross-sectional shape which is apparent from FIG. 5. The elastomeric layer 30 is succeeded by the metallic sockets 31, 32. The socket 31 is in snug contact at one end with the inside boundary surface 33 of the hollow-cylindrical drum 34 of the instrument carrier 28 and at the other end with the lower boundary surface 35 of a flange or lug 36 of the drum 34. The inner boundary surface 37 of the metal socket 32 and its lower boundary surface 38 thereof contact at one end directly the instrument 25 and at the other end an annular flange 39 of the instrument. The metal-clad rubber spring 29 may be held in position by bolts 40, 41 etc. The arrangement which has been described will take up and damp shocks regardless of their direction.

Figure 6:
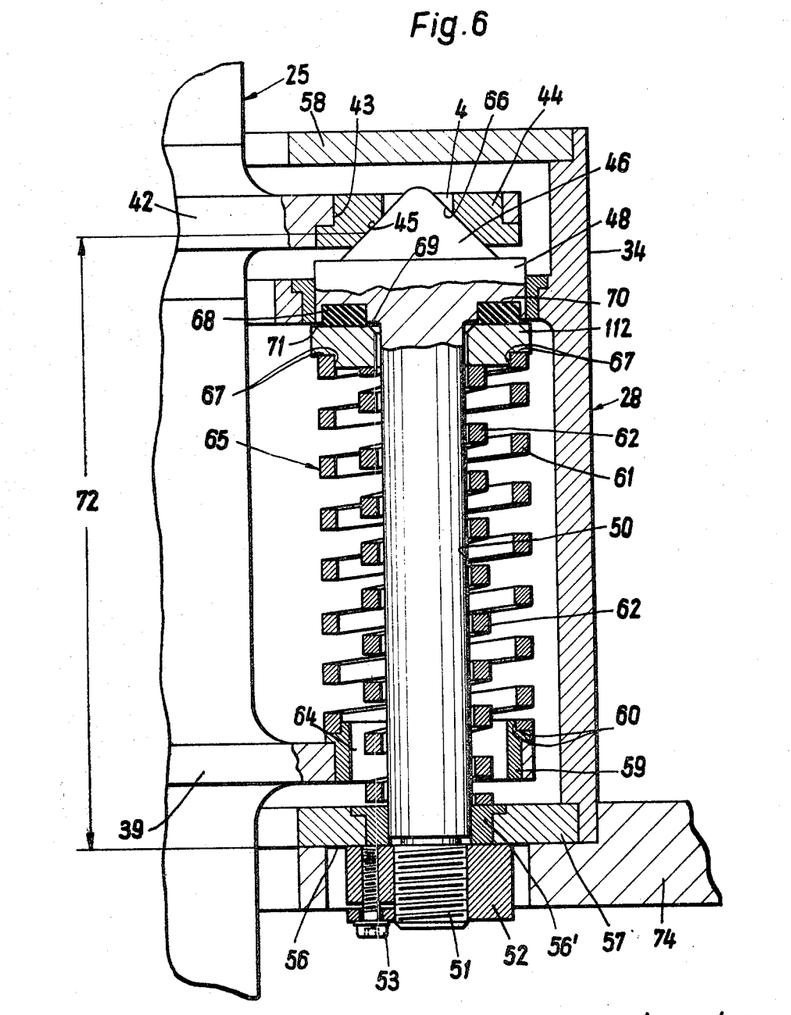
FIG. 6 is an enlarged sectional view similar to that of FIG. 3. The restoring means are shown in an adjusted initial position, to which the instrument is to be restored when the instrument carrier has been subjected to an upwardly directed shock.

The restoring means according to the invention are shown in the left-hand half of FIG. 4 and in FIG. 6. It is apparent that the instrument 25 has a flange 39 and a wider flange 42. A continuous annular flange may be replaced by sector- or segment-shaped lugs on the instrument 25, as is shown in FIGS. 1 to 3. The flange 42 is formed with apertures 43, which are regularly disposed on a circle and receive inserts 44, which form seats 45 for the end cones 46 of pins 47. Below the end cones 46, the pins 47 have guiding members 48 in the form of short cylindrical portions, which are succeeded in FIG. 4 by the spring-guiding portions 49. Each pin has a shank 50 which is reduced in diameter relative to parts 48, 49. The shank 50 has a screw-threaded end portion 51, which carries the adjusting nut 52. The latter is held in position by a locking means 53. The head 48 of the pin serves as a guiding means and has associated with it the bearing ring 54, which is carried by an inner flange 55 of the drum 34. A further guiding member is constituted by the shank 50 of the pin. That portion of said pin which is disposed above the threaded extension 51 is surrounded by a bearing ring 56', which is received by an end ring member 57 of the drum 34.

The end ring member 57 of the instrument carrier 28 is confronted by a cover ring member 58. The flange 39 of the instrument 25 serves for receiving the abutments 59, which form a seat 60 for an outer spring 61. The other end of the spring 61 bears at one end on a shoulder which is formed on the head 48 of the pin because the spring-guiding portion 49 is somewhat smaller in diameter than the head 48 of the pin. An inner spring 62 is also provided, which is concentric to the spring 61. The spring 62 bears at one end on the lower boundary surface 63 of the guiding portion 49 for the spring 61 and at the other end on the bearing ring 56 of the end ring member 57 of the instrument carrier 28. For this purpose, the spring abutments 59 in the flange 39 of the instrument 25 are formed with passages 64 for the springs 62. The springs 61, 62 are suitably prestressed so that the instrument 25 does not leave its position unless the highest acceleration is exceeded which is considered allowable.

The dimensions and workpieces of the springs 61, 62 are so selected that the spring characteristics and initial stresses of the springs required for a restoring of the instrument 25 to its initial position shown in FIG. 4 and 5 are the same. As a result, the restoring of the instrument 25 to its initial position will be effected in the same manner regardless of the direction of the shock. The entire mounting of the instrument is thus independent of the direction of shock. This results in important advantages regarding the function of such instruments.

FIG. 6 shows in section on an enlarged scale a resiliently yieldable element, which is provided in addition to the elastically yieldable means 29 having a high damping capability and serves for damping rebound phenomena and rebound vibrations. This additional element, which is not shown in FIG. 4, will be described more fully in connection with FIG. 6.

The springs 61, 62 need not be coaxial as is shown in FIGS. 4 and 5. On both sides of a spring which fulfils the function of one of the springs 61, 62, two further springs may be provided, which perform the function of the second spring. A common yoke may then form the abutments for the springs. These and other modifications are within the scope of the invention.

The embodiment shown in FIGS. 6 to 9 corresponds substantially to that of FIGS. 4 and 5 but has an element having a high damping capability for rebound shocks and rebound vibration. This element is provided in addition to the resiliently yieldable means for damping the shock forces transmitted to the instrument. FIGS. 6 to 9 show that both functions are independent of the direction of the shocks.

In FIGS. 6–9, like reference numbers designate the same parts as in FIGS. 4 and 5. The restoring means designed according to the invention are generally designated 65. They comprise a pin 50, which has a head 48 and an end cone 46 formed with the aligning, fitting and engaging surfaces 66. The bushing 43 is associated with the end cone 46, more particularly, the boundary surfaces 66 thereof. The bushing 43 constitutes an insert in the flange 42 of the instrument 25 and forms a mating seat 45. Such bushings 43 are spaced around the flange 42 on a circle. The provision of three bushings 42 defines an initial position of the instrument 25 relative to the instrument carrier 28 and other parts, which are rigid with the instrument carrier, such as a vehicle which carries the entire structure.

That end of the outer spring 61 which is remote from the end cone is received in a corresponding groove 60 of the annular abutment 59. The latter is received in a corresponding recess of the flange 39 of the instrument. The recesses for receiving the annular abutments 59 are distributed on a circle like the seat-forming bushing 43 in the flange 42 of the instrument.

The embodiment of FIGS. 6–9 differs from the embodiment of FIGS. 4 and 5 in that an element 68 having high damping capabilities is provided in addition to the resiliently yieldable means 15, 16 and 29 having a high damping capability. In the present embodiment, the element 68 is a ring. Suitable materials are copper, brass, aluminium and plastics materials, particularly polymers of an anhydrous $CH_2O$. Other suitable materials are metal wire mesh, preferably in the form of bodies, blocks, pieces or pads. An annular groove 70 is formed in the head 48 of the pin and open on that boundary surface 69 which is remote from the end cone. The groove 70 receives the additional damping element 68, which protrudes over the boundary surface 69 in the direction away from the end cone 46 so that the additional damping element 68 can be subjected to permanent deformation within an allowable limit before that boundary surface 71 of the abutment 112 which faces the end cone can engage the boundary surface 69 of the head 48 of the pin. The abutment 112 has an annular groove 67, which receives the top turn of the spring 61.

The mode of operation of the restoring means shown in FIGS. 6–9 is directly apparent from the foregoing description. With the aid of the adjusting nut 52 and its locking means 53, the instrument may be adjusted to a defined initial position so that a snug, force-transmitting contact between the surfaces 45, 66 is established under the action of the springs 61, 62. In view of the shocks to be expected, the force exerted by the springs 61, 62 is such that the restoring of the instrument 25 to its initial position, shown in FIG. 6, is ensured. In this initial position there is a certain distance between the center of the height of the contacting surfaces 45, 66 and the plane which contains the lower end face 56 of the ring member 57 of the instrument carrier 28. The overall arrangement is such that this distance 72 will not be changed even in the case of a permanent deformation of the additional damping element 68 under the action of peak accelerations which occur when the parts 43, 46 engage each other, regardless of the direction of shock.

Figure 7:
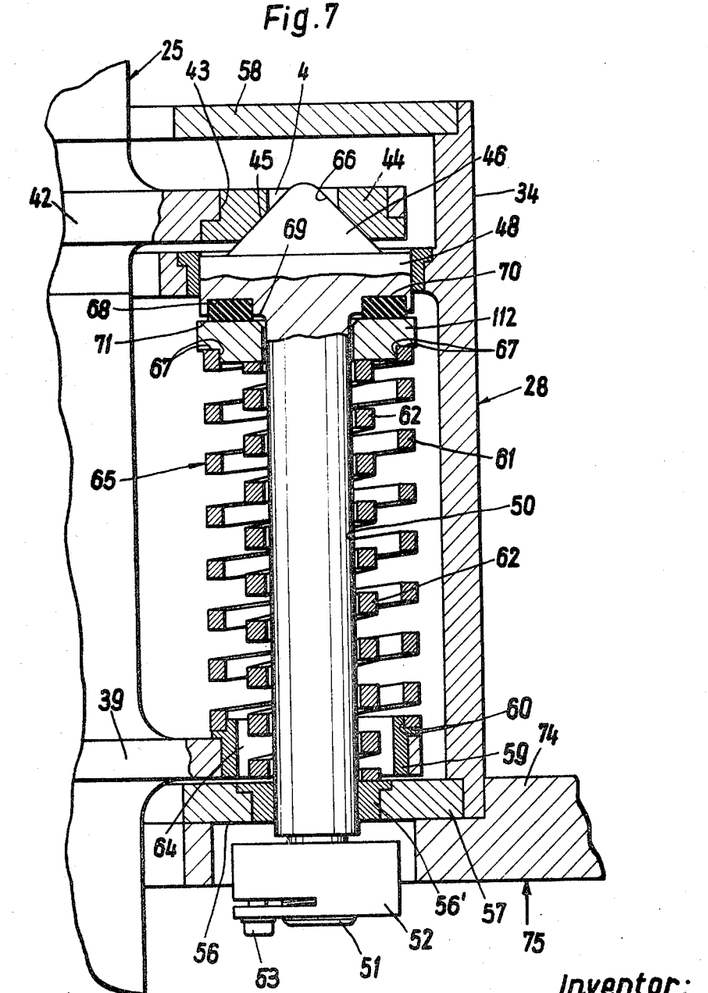
FIG. 7 is a sectional view similar to FIG. 6 but showing the elements displaced under the influence of a shock in upward direction.

FIG. 7 shows the conditions which are obtained when a violent shock in the direction of shock 75 is applied to the instrument carrier. Under the action of that shock, the instrument carrier 28 is raised in the direction of the arrow 75 whereas the instrument 25 lags behind owing to its inertia. Parts 43, 46 remain in contact with each other while the shock forces are reduced and possibly dissipated by the resiliently yieldable elements 15, 16; 29 having a high damping capability. The pressure applied per unit of area of the contacting surfaces 45, 66 is increased but the additional damping element 68 is not stressed. As the inner spring 62 bears with its lower end on the instrument carrier 28, more particularly, on the annular member 57 of said carrier, the inner spring 62 will be stressed in compression if the stressed parts undergo a permanent deformation.

Figure 8:
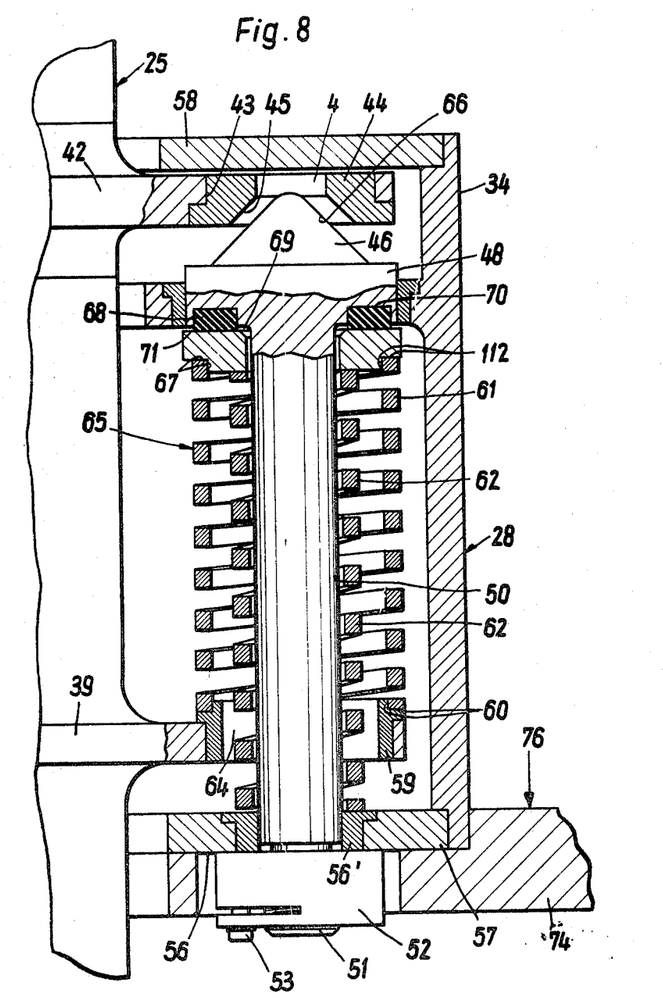
FIG. 8 is a sectional view similar to FIG. 6 showing the parts of the restoring means in a position which they assume in response to a downwardly directed shock applied to the instrument carrier.

Different conditions will result from a shock in the direction 76, as is shown in FIG. 8. The instrument 25 will again lag behind owing to its inertia whereas the instrument carrier 28 will lead the instrument in the direction of the arrow 76. The end cone 46 is pulled down by means of the adjusting nut 52, the screw-threaded portion 51, the shank 50 and the head 48 of the pin so that the surfaces 45, 66 define the distance which is illustrated by way of example in FIG. 8. The additional damping element 68 causes that end of the outer spring 61 which faces the end cone to follow the movement of the head 48 of the bolt. The outer spring 61 is thus compressed. The inner spring 62 is not loaded because its abutment formed by the inserted bushing 56' has followed the movement in the direction 76. The resiliently yieldable means 15, 16; 29 having a high damping capability ensure that the shock forces will be reduced and dissipated so that the parts come to rest in the position shown in FIG. 8. Part 46 provided with the surface 66 now resumes its upward movement relative to the part 43 with the seating surface 45 under the action of the relaxing outer spring. This action is assisted by the relaxation of the resiliently yieldable means, not shown, having a high damping capability and results in an engagement between the surfaces 45, 66. This gives rise to secondary shocks and vibrations, which are damped because the restoring forces of the spring 61 are transmitted only with high damping by the additional damping element 68. The same remark is applicable to the forces exerted by the resiliently yieldable means having a high damping capability because these forces can also be transmitted only by the additional damping element 68 in view of the arrangement of the entire restoring means 65, which are the only means that control the restoring. With the aid of the means proposed according to the invention, a generation of secondary shocks and of undesired periodical vibration is thus prevented. Any vibration which can arise will be aperiodic and will decay quickly as a result of the high damping capability of the materials forming the additional damping element 68.

Figure 9:
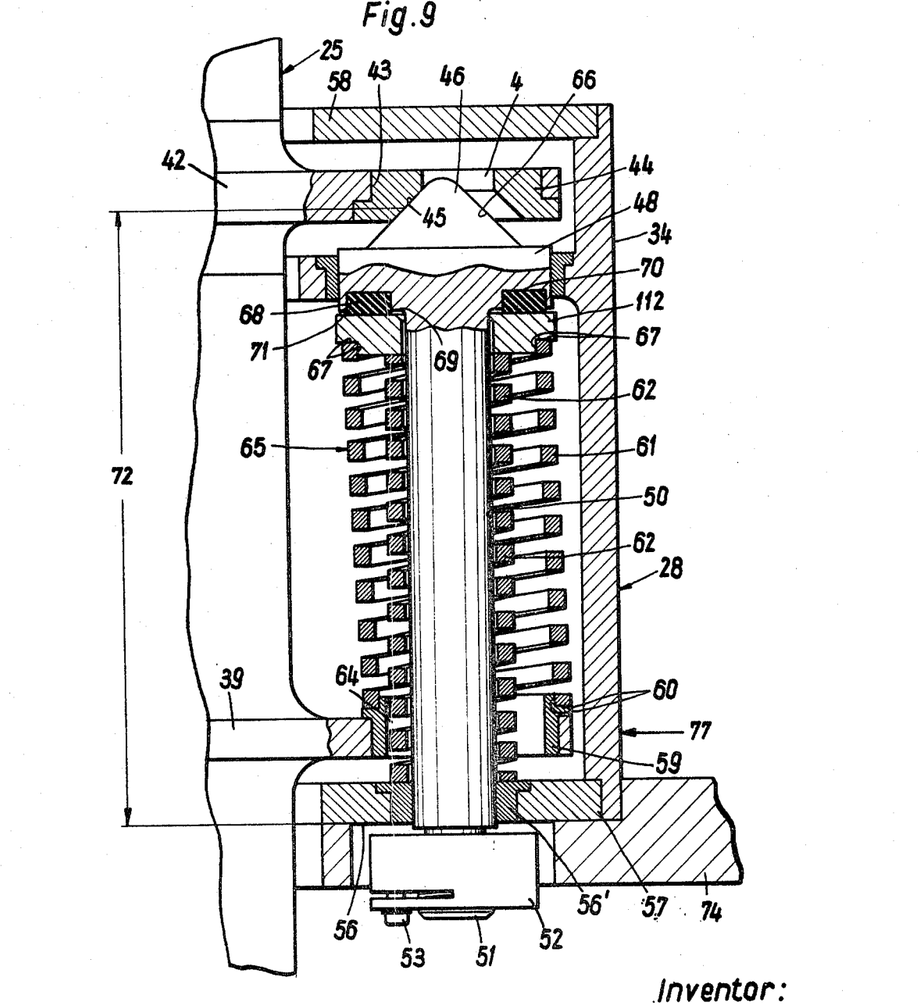
FIG. 9 shows the relative position which is assumed by the parts of the restoring means in response to a lateral shock applied to the instrument carrier from right to left in FIG. 9. A shock applied to the right would result in a position which is in mirror symmetry to that of FIG. 9.

What has been said in connection with FIG. 8 is also applicable to the occurrence of a lateral shock in the direction 77 shown in FIG. 9. It is apparent that the inner spring 62 and the outer spring 61 are now stressed in compression. A clearance between parts 43, 46 results again so that secondary shocks and vibration might occur. These will be reliably suppressed by the additional damping element 68. As the resiliently yieldable means, not shown, having a high damping capability are effective in all directions, any shocks which occur in the direction 77 or in the opposite direction will also be effectively damped, and secondary shocks and vibration will be suppressed so that a mounting according to the invention meets all requirements to be fulfilled.

It is inherent in the arrangement that has been disclosed that the arrangements shown in the illustrated embodiments may be kinematically inverted if the resulting arrangements are substantially equivalent to those that are not kinematically inverted. For instance, the inserted bushings 43 might be replaced by inserts that are provided with end cones similar to cones 46. In this case, the heads 48 of the pins are formed with recesses formed with aligning, fitting and engaging surfaces in registry with the boundary surfaces 45. This kinematic inversion will not change the result that can be obtained. The damping element 68 would remain in the heads 48 of the pins and would thus have the same effect as in the embodiments of FIGS. 6–9. On the other hand, the additional damping element 68 could be connected to the abutments 112, e.g., by being inserted therein just as in the heads 48 of the bolts in the illustration. Such obvious modifications are within the scope of the invention because in such case the additional damping element 68 will be in such a position that the adjusted distance 72 is not changed even though a permanent deformation of the additional damping element 68 would be inevitable.

Figure 10:
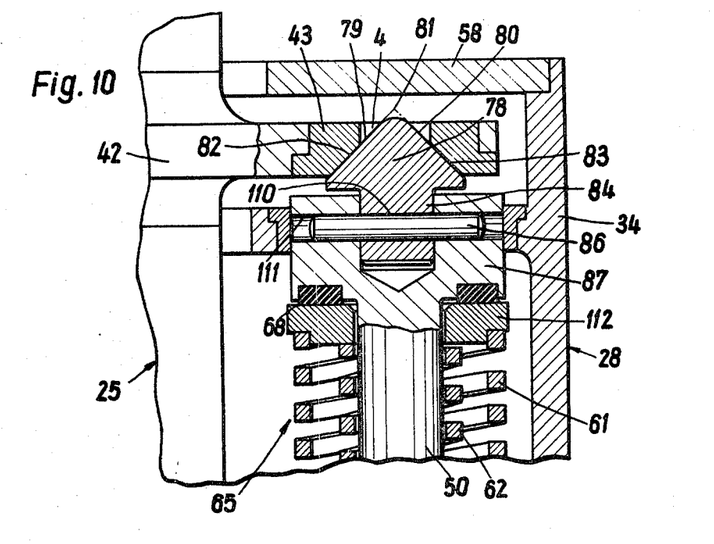
FIG. 10 is a vertical sectional view showing an instrument, an instrument carrier, part of the restoring means and a tilting joint of that part of a first mating element which is formed with aligning, fitting and engaging surfaces cooperating with mating surfaces of the second mating element.

In the embodiment shown in FIG. 10, same reference characters designate the same parts as in FIGS. 4 to 9.

The mounting which is shown in FIG. 10 and will be described hereinafter differs from the previously described embodiments of the invention in that essential elements of the restoring means 65 are split.

The restoring means 65 comprises a head piece in the form of the section 78 of a prism, which has the form of an equilateral triangle in cross-section. The aligning, fitting and engaging surfaces 79, 80 of said prism lie in planes which intersect in a line 81, which is at right angles to the plane of the drawing. The bushing 43 is inserted in the flange 42 of the instrument and forms surfaces 82, 83, which are complementary to the prism surfaces 79, 80 and lie also in planes that intersect in the line 81 at right angles to the plane of the drawing when part 78 of the element 78, 84, 86, 87, 50, 61, 62 etc. contacts part 43 of the mating element 43, 42 etc. The section 78 of the prism has an extension 84, which is tiltably mounted in the head piece 87 of the pin, which has a shaft 50. Parts 78, 84, on the one hand, and 87, on the other hand, of each restoring means 65 are interconnected by a pivot pin 86, which has a center line at right angles to the line of intersection 81. The latter may be an imaginary line because it is not required to embody it physically although this would be possible. Essential for the function are only the prism surfaces 79, 80, which are inclined like the slides of a gable roof. The line 81 would correspond to the ridge of the roof.

The restoring means comprise additional parts, which have been described hereinbefore, such as a spring abutment 112, which is engaged by an inner spring 62 and an outer spring 41 at those ends thereof which face the prism section 78. There is also the element 68 of resiliently yieldable material having a high damping capability. The element 68 is held by the head 87 of the bolt 50 and serves for absorbing and damping rebound shocks and rebound vibration which may arise between the parts 42, 43; 78, 84, 87, 50 etc.

In view of what has been described hereinbefore, the mode of operation of a mounting designed according to FIG. 10 is obvious from the foregoing description.

The tilting joint 86, 110, 111 between the parts 78, 84, on the one hand, and 87, 50 etc., on the other hand, enables such an adjustment of the part 83 formed with the significant aligning, fitting and engaging surfaces 79, 80 relative to the remaining parts of the restoring means that a snug contact is established between the surfaces 79, 80 and 82, 83 as soon as a contacting position as shown in FIG. 10 is assumed. Any displacement between parts 25, 28 cannot disturb the snug contact between surfaces 79, 80; 82, 83. The object of the invention has thus been established.

Figure 11:
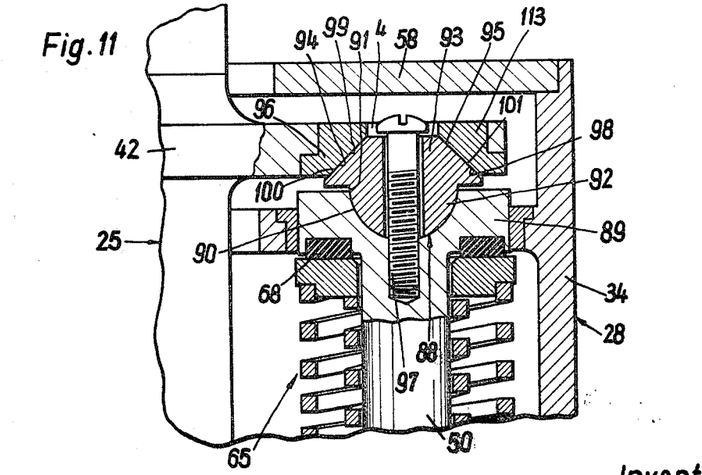
FIG. 11 is a view similar to FIG. 10 and shows a design in which the cooperating parts are joined by a hemispherical joint.

The embodiment shown in FIG. 11 differs from that of FIG. 10 in that the tilting joint is replaced by a support in the form of a hemispherical joint 88. The pin is provided with the shank 50 and with head 89 having a hemispherical, concave bearing surface 90, which mates with a congruent, convex hemispherical surface 91 of the projection 92 formed by the end cone 93. The same has a conical surface 94, which constitutes and aligning, fitting and engaging surface. The inserted bushing 96 is provided with a hollow conical surface 95, which is congruent to the surface 94. Just as the inserted bushings 43 shown in FIG. 10, a plurality of the inserted bushings 96 are distributed on a circle in the flange 42 of the instrument. Three inserted bushings 43, 96 define an initial position of the parts of the assembly. The parts 92, 93, of the joint are held and locked by the pin assembly 97, which has a head 89 that is secured in the shank 50 of the pin. The locking means 97 ensure the clearance required in the joint between parts 92, 93, on the one hand, and 89, on the other hand.

Just as the surface 79 in FIG. 10, the surface 94 may be one of the two prism surfaces 99 and 98. In this case the complementary, congruent, left-hand surface of the hollow prism would be the boundary surface 100 of the insert 113 in the flange 42. In this case the insert 113 would be straight. Also, the straight insert 113 would be formed with the right-hand surface 101 of the hollow prism. This surface would correspond to the prism surface 99 and would be complementary and congruent thereto.

The mounting shown in FIG. 11 has the same mode of operation as that of FIG. 10 with the difference that the hemispherical joint permits of a self-adjustment in all directions.

Figure 12:
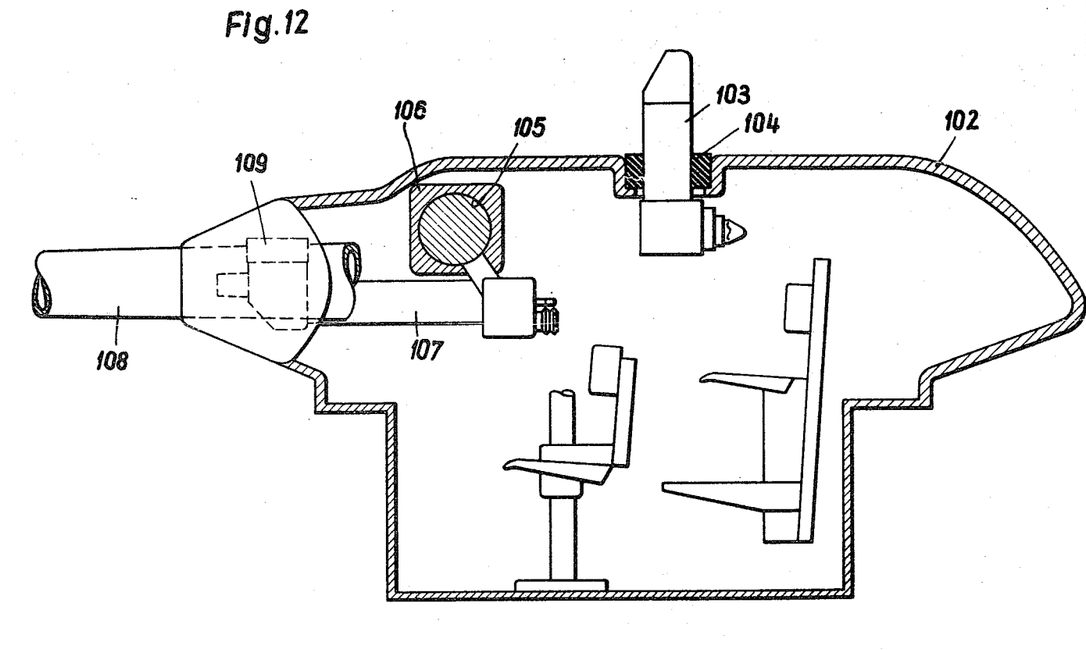
FIG. 12 shows three embodiments of a mounting according to the invention provided on the top of a vehicle.

FIG. 12 illustrates by way of example with reference to a vehicle top the large number of ways in which mountings according to the invention having resiliently yieldable means that possess a high damping capability can be used to take up shock forces applied to delicate instruments of the vehicle during travel or bombardment thereof, in conjunction with means which restore the instrument with any selected accuracy to the initial position which is occupied before the shock. In the vehicle top 102, the telescope 103 of the tank commander has a mounting 104 according to the invention. A rangefinder 105 requires also a mounting 106 according to the invention in order to perform its function properly. The gun pointer for the gun 108 is provided with a telescopic sight 107, which has a mounting 109 according to the invention meeting the requirements to be fulfilled.

What is claimed is:

1. Shock absorbing mounting means for mounting an object in a predetermined position on a support and for restoring said position of the object relative to said support after displacement of the object by a shock, said mounting means comprising at least one rigid member mounted in said support movable in a predetermined direction, said member having engaging faces inclined relative to said direction and engaging complementary faces fixed to said object; and a pair of pre-stressed spring means for each rigid member, each of said spring means being operatively connected at one end thereof to said rigid member and one of said spring means engaging with the other end thereof said support means and the other of said spring means engaging with the other end thereof said object for pressing said engaging faces on said rigid member and said complementary faces fixed to said object against each other.

2. Shock absorbing mounting means as defined in claim 1, and including elastically yieldable damping means having a high damping capability between said support and said object.

3. Shock absorbing mounting means as defined in claim 1, wherein said object has a longitudinal axis, and wherein three rigid members are provided uniformally distributed about said axis and each movable in direction of said axis.

4. Shock absorbing mounting means as defined in claim 3, and including three elastically yieldable damping means having high damping capability respectively arranged between adjacent rigid members and each engaging with opposite ends said support and said object, respectively.

5. Shock absorbing mounting means as defined in claim 4, wherein said damping means are constructed and arranged to absorb shocks in axial direction and in direction transverse to said axis.

6. Shock absorbing mounting means as defined in claim 3, wherein each of said rigid members is in the form of a pin movable in direction of said axis and having at one end thereof a head provided with said engaging faces.

7. Shock absorbing mounting means as defined in claim 6, wherein said engaging faces taper toward the free end of said head.

8. Shock absorbing mounting means as defined in claim 6, wherein said head has a conically engaging face.

9. Shock absorbing mounting means as defined in claim 6, wherein said head is connected to said pin for a limited movement with respect thereto.

10. Shock absorbing mounting means as defined in claim 9, wherein said head is mounted on said pin tiltable about an axis transverse to said longitudinal axis of the pin.

11. Shock absorbing mounting means as defined in claim 9, wherein said head is mounted on said pin for limited universal tilting movement relative thereto.

12. Shock absorbing mounting means as defined in claim 6, and including adjusting means connected to said pin for limiting axial movement of said pin under the influence of said spring means.

13. Shock absorbing mounting means as defined in claimed 12, wherein said adjusting means comprises a nut threadingly connected to the end of the pin opposite to the head end thereof.

14. Shock absorbing mounting means as defined in claim 1, and including elastically yieldable damping means having a high damping capability carried by said rigid member on a face thereof facing away from said engaging faces.

15. Shock absorbing mounting means as defined in claim 6, wherein said pair of spring means are constituted by a pair of compression springs arranged about said pins substantially co-axial therewith.

16. Shock absorbing mounting means as defined in claim 15, and including an angular member substantially coaxially mounted on said pin slidably in axial direction of the latter, one end of each spring abutting against said angular member for biasing the latter towards the head, and elastically yieldable damping means between said angular member and said head.

17. Shock absorbing mounting means as defined in claim 16, wherein said elastically yieldable damping means is link-shaped and mounted in a groove formed in said head on the sides thereof facing away from said engaging faces.

18. Shock absorbing mounting means as defined in claim 1, wherein said object is an optical device, and wherein said mounting means cooperate with said optical device for restoring the line of sight of the latter after the same has been subjected to shocks.

References Cited

UNITED STATES PATENTS

| 2,631,841 | 3/1953 | Tillou et al. | 248—251.1 X |
| 2,678,797 | 5/1954 | Roy | 248—358 |

ROY D. FRAZIER, Primary Examiner

J. F. FOSS, Assistant Examiner

U.S. Cl. X.R.

248—21, 358; 267—1; 350—245